No. 658,573. Patented Sept. 25, 1900.
J. J. MURPHY.
STRAINER.
(Application filed July 14, 1900.)
(No Model.)
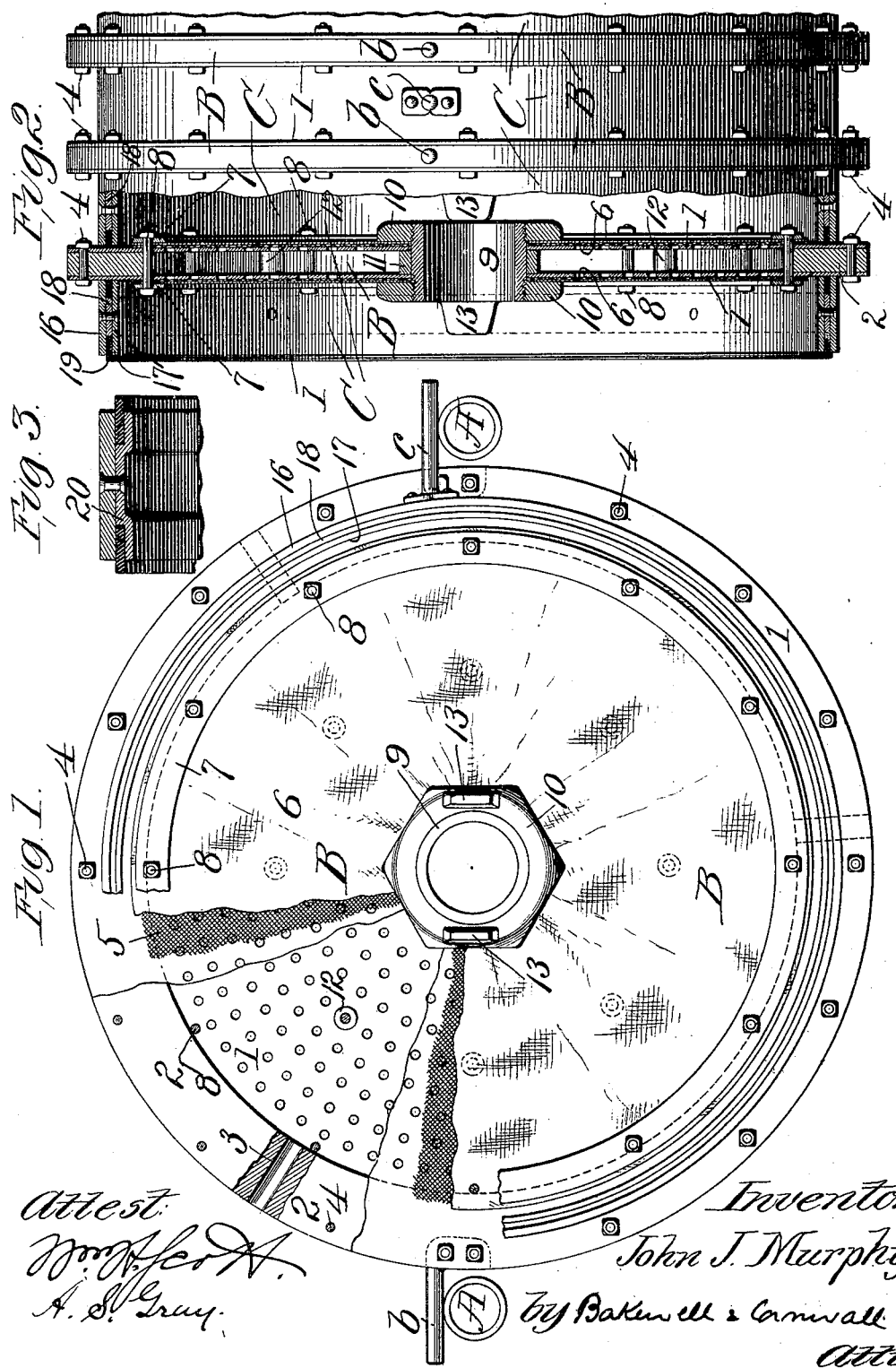

UNITED STATES PATENT OFFICE.

JOHN J. MURPHY, OF VINCENNES, INDIANA, ASSIGNOR TO THE T. S. TEUSCHER COMMISSION COMPANY, OF ST. LOUIS, MISSOURI.

STRAINER.

SPECIFICATION forming part of Letters Patent No. 658,573, dated September 25, 1900.

Application filed July 14, 1900. Serial No. 23,580. (No model.)

*To all whom it may concern:*

Be it known that I, JOHN J. MURPHY, a citizen of the United States, residing at the city of Vincennes, county of Knox, State of Indiana, have invented a certain new and useful Improvement in Strainers, of which the following is a full, clear, and exact description, such as will enable others skilled in the art to which it appertains to make and use the same, reference being had to the accompanying drawings, forming part of this specification, in which—

Figure 1 is an elevational view of my improved strainer, a portion of the inner straining material being removed to show the interior. Fig. 2 is a side elevational view showing one of the strainers and spacing-rings in vertical section, and Fig. 3 is a detail sectional view of a modified form of spacing-ring.

This invention relates to a new and useful improvement in strainers, particularly designed for straining or separating liquor from what is known as "distillery-slop"—that is, the wet mealy mass which results from "mash" and which is designed to be separated from the liquid in order to collect the meal subsequently used for various purposes, such as food for cattle. It is quite obvious, however, that this invention can be employed for straining various substances, and hence I do not wish to limit myself to any particular use to which it may be put.

The essential features of this invention reside in the novel construction of the strainer and the spacing-ring which is interposed between different strainers.

In operation there are a series of strainers with interposed spacing-rings supported by trunnions on parallel rods or pipes, means being provided at at least one end of the series of strainers for clamping them in position. The liquid mass—such, for instance, as distillery-slop—is pumped under pressure through a central opening formed by the alining bores in the hubs of the strainers, which openings communicate with the chambers formed by the several spacing-rings. During this filling operation the liquor from the mass is forced by pressure through fabric forming the side walls of the strainers into the interior strainer-chamber, whence it escapes through suitable openings around the periphery thereof, being finally conducted to any suitable place. The solid material is retained in the chamber formed by the spacing-rings, and as this material will to a great extent choke the communicating openings between the spacing-ring chambers some suitable means (preferably in the form of a screw conveyer, though not shown in the drawings) is employed to keep these openings free and the communications clear. This screw conveyer carries the deposit from one chamber to the other, and so assists in distributing the material throughout the several chambers formed by the spacing-rings. After the strainer has been completely filled with the deposit and all, or nearly all, of the liquor has been expressed thereform the supply is stopped and the clamping device removed, permitting the first spacing-ring to be slid outwardly a convenient distance and rocked on its trunnion, whereby the collected mass or pulp-like substance is easily removed. The next sieve is then slid outwardly and then the next ring, and so on, until all of the rings have been separated and their contents removed for the purpose of being dried.

Several openings may be arranged around the periphery of the sieve, which openings are ordinarily closed by plugs, and through which openings steam or jets of hot water may be introduced for the purpose of scouring or cleaning the interior of the sieve.

The machine is assembled by sliding the rings and sieves along their parallel supports as far as they will go, each one limiting the movement of the other until all have been properly spaced, after which they are clamped together and the device is then ready to receive another charge.

In United States Patent No. 634,054, dated October 31, 1899, granted upon an application filed by me, will be found illustrated and described a strainer substantially corresponding to the above description. The strainer shown in my former patent has the several sieves covered by fabric secured to the periphery of the sieve, and I have found in practice that when the spacing-rings abut against the sieves they will chafe or wear away the fabric, so that it is necessary to frequently renew said fabric.

It is the object of my present invention to obviate this objection and also to provide suitable packing material between the spacing-rings and sieves to form tight joints.

My invention therefore consists in making the fabric covering of less diameter than the sieve proper, securing said fabric in position by a suitable clamping-ring and leaving a space therearound against which is seated the packing of the spacing-rings, the seat for receiving the packing being preferably the material of which the perforated plate is composed—to wit, usually metal.

In the drawings, A indicates parallel pipes or supports for the sieves and spacing-ring, and B indicates what I will term the "sieve" as an entirety. C indicates what I will term the "spacing-rings." Both the sieve and spacing-rings are provided with trunnions $b$ and $c$, which rest upon the pipes A, and so support the sieves and spacing-rings in position. The sieve B consists of two metallic side plates 1, between the peripheries of which is arranged an annular ring 2, forming a chamber between the plates for receiving the liquor. This ring 2 is provided with suitable openings 3, which establish communication between the chamber therein and the interior, for purposes described. Bolts 4 or other suitable fastening devices are provided for clamping the side plates and ring 2 in position. Side plates 1 are perforated within the lines of the ring 2 for well-understood purposes.

5 indicates a screen, preferably of open-mesh fabric, arranged externally the plates and whose diameter is slightly greater than the diameter of the inner perimeter of ring 2.

6 indicates fabric, preferably closely woven, which is arranged outside of the screen 5 and whose diameter is substantially coextensive therewith. A clamping-ring 7 is applied at the periphery and over fabric 6 for securing the same and screen 5 in position, said clamping-ring being secured in position by bolts 8 or other suitable fastening means. This screen, woven fabric, clamping-ring, &c., are duplicated on each side of the sieve.

An axial opening is provided through the several parts of which the sieve is composed and a hub 9 introduced therethrough, said hub being provided with threaded ends for receiving clamping-nuts 10, which impinge against the cloths 6 on each side and bind the same and the other parts against a hub-ring 11, which hub-ring forms a spacer to preserve the width of the chamber at the center of the sieve and also assist in forming a rigid structure when the nuts are screwed home. Hollow or solid stay-bolts 12 may also be distributed between the plates 1 at suitable points for supporting the same.

13 indicates lugs or extensions extending from the nuts 10 and designed to coöperate with the next sieve in advance to make a solid structure when the parts are assembled and prevent the sieves being bulged or buckled when the material is introduced under pressure and where there is likelihood of an uneven distribution, so that more material collects at one point than at another. A screw conveyer may be employed through the alining openings in the hub-pipes in the same manner as shown and described in my former patent.

The spacing-rings C, as shown in Fig. 2, consist of an external ring 16 and an inner ring 17, the two being spaced apart by a centrally-arranged spacing-ring 18, this structure providing what is equivalent to laterally-opening grooves in the sides of the ring near its periphery. In the grooves or seats so provided are arranged packing-rings 19, which preferably extend laterally beyond the edges of the rings 16 and 17, so that when the structure is clamped in position sufficient space is provided wherein the packing-rings may be compressed, and thus form a tight joint.

In the construction shown in Fig. 3 the spacing-ring is built up of an outer ring and an inner ring 20, which inner ring is so shaped in cross-section as to provide the laterally-opening seats or grooves for the reception of the packing-rings, the central portion of the outer periphery of this ring being radially enlarged to coincide with the internal diameter of the outer ring, with which it coöperates. These several rings composing the spacing-ring may be riveted together, as is well understood. The packing-rings are preferably loosely introduced, so that they may be quickly and readily renewed.

I am aware that minor changes in the arrangement, construction, and combination of the several parts of my device can be made and substituted for those herein shown and described without in the least departing from the nature and principle of my invention.

Having thus described my invention, what I claim, and desire to secure by Letters Patent, is—

1. The combination with perforated plates, of a ring 2 for separating the same, fabric arranged externally of, and of less diameter than, said plates, so as to provide a space beyond the edges of the fabric for the reception of spacing-rings, and means for securing said fabric in position; substantially as described.

2. The combination with perforated plates, of a ring 2 for separating the same, wire mesh arranged externally said plates, fabric arranged over said wire mesh, said mesh and fabric being of less diameter than the plates so as to leave a space therebeyond for the reception of spacing-rings, means for securing said fabric and mesh in place, and spacing-rings; substantially as described.

3. The herein-described spacing-ring provided with laterally-opening grooves near its periphery, and packing arranged in said grooves and extending beyond the edges of the spacing-ring; substantially as described.

4. The herein-described spacing-ring comprising inner and outer rings secured together, said rings forming seats or grooves which open laterally, and packing in said seats or grooves; substantially as described.

5. The combination with a sieve comprising a hollow body portion, fabric secured in position upon the side faces of said hollow body portion, space being left beyond the outer edges of the fabric for the reception of spacing-rings, and spacing-rings provided with laterally-extending packing to coöperate with the seats in the spaces provided on the sieves for its reception; substantially as described.

In testimony whereof I hereunto affix my signature, in the presence of two witnesses, this 10th day of July, 1900.

JOHN J. MURPHY.

Witnesses:
W. H. ENGEL,
W. C. SNEED.